(12) United States Patent
Watanabe et al.

(10) Patent No.: US 8,779,320 B2
(45) Date of Patent: Jul. 15, 2014

(54) RESISTANCE WELDING METHOD, RESISTANCE WELDER, AND METHOD AND DEVICE FOR EVALUATING RESISTANCE WELDING

(75) Inventors: Goro Watanabe, Tajimi (JP); Yasuhiro Ishii, Nisshin (JP); Yasumoto Sato, Nagoya (JP); Tsunaji Kitayama, Nagoya (JP); Hisaaki Takao, Seto (JP); Hideki Teshima, Miyoshi (JP); Keisuke Uchida, Nagoya (JP)

(73) Assignees: Kabushiki Kaisha Toyota Chuo Kenkyusho, Aichi-gun (JP); Toyota Jidosha Kabushiki Kaisha, Toyota (JP)

( * ) Notice: Subject to any disclaimer, the term of this patent is extended or adjusted under 35 U.S.C. 154(b) by 155 days.

(21) Appl. No.: 13/060,363

(22) PCT Filed: Jul. 20, 2010

(86) PCT No.: PCT/JP2010/004653
§ 371 (c)(1),
(2), (4) Date: Feb. 23, 2011

(87) PCT Pub. No.: WO2011/016193
PCT Pub. Date: Feb. 10, 2011

(65) Prior Publication Data
US 2012/0126780 A1 May 24, 2012

(30) Foreign Application Priority Data
Aug. 1, 2009 (JP) .................................. 2009-180235

(51) Int. Cl.
*B23K 11/00* (2006.01)
(52) U.S. Cl.
USPC .......................................................... 219/55
(58) Field of Classification Search
CPC ....................................................... B23K 11/24

USPC ............... 219/108, 109, 110, 117.1, 119, 120
See application file for complete search history.

(56) References Cited

U.S. PATENT DOCUMENTS 2,740,044 A * 3/1956 Storm ........................... 219/110
3,518,395 A * 6/1970 Vanderhelst ................... 219/110
(Continued)

FOREIGN PATENT DOCUMENTS

EP  0 350 013 A1  1/1990
JP  A-51-66885    6/1976
(Continued)

OTHER PUBLICATIONS

International Search Report issued in International Application No. PCT/JP2010/004653 on Nov. 19, 2010.
(Continued)

*Primary Examiner* — Dana Ross
*Assistant Examiner* — Joseph Iskra
(74) *Attorney, Agent, or Firm* — Oliff PLC

(57) ABSTRACT

Exemplary embodiments provide a resistance welding method capable of stabilizing quality or improving efficiency of resistance welding such as spot welding. This resistance welding method comprises a calculating step of calculating resistance ratio X of a second electric resistance value R2 of workpieces to be joined in residual heat after Joule heating stops to a first electric resistance value R1 of the workpieces immediately before the Joule heating stops or vice versa (R2/R1 or R1/R2); a determining step of determining whether the resistance ratio X is equal to or greater than a threshold value Xn, and a reheating step of carrying out the Joule heating again when the resistance ratio X is smaller than the threshold value Xn. Thereby at least part of a welding portion is melted and solidified to reliably form a nugget, and a stably resistance-welded member can be provided.

13 Claims, 4 Drawing Sheets

(56) References Cited

U.S. PATENT DOCUMENTS

| | | | |
|---|---|---|---|
| 4,302,653 A | | 11/1981 | Denning et al. |
| 4,503,311 A | * | 3/1985 | Houchens et al. ............ 219/109 |
| 4,577,086 A | * | 3/1986 | Needham et al. .......... 219/117.1 |
| 4,963,707 A | * | 10/1990 | Zyokou et al. ................ 219/110 |

FOREIGN PATENT DOCUMENTS

| | | | |
|---|---|---|---|
| JP | A-2-217179 | | 8/1990 |
| JP | A-7-130293 | | 5/1995 |
| JP | H07185832 | * | 7/1995 |
| JP | A-8-318377 | | 12/1996 |
| JP | A-9-160510 | | 6/1997 |
| JP | 2001018073 | * | 1/2001 |
| JP | A-2004-16510 | | 1/2004 |
| JP | A-2006-55893 | | 3/2006 |
| JP | A-2008-73703 | | 4/2008 |
| JP | A-2008-254005 | | 10/2008 |

OTHER PUBLICATIONS

Written Opinion of the International Searching Authority issued in International Application No. PCT/JP2010/004653 on Nov. 19, 2010.

* cited by examiner

RESISTANCE WELDING METHOD, RESISTANCE WELDER, AND METHOD AND DEVICE FOR EVALUATING RESISTANCE WELDING

TECHNICAL FIELD

The present invention relates to a resistance welding method, a resistance welder and a method and device for evaluating resistance welding. More specifically, the present invention relates to a resistance welding method, a resistance welded member, a resistance welder, a method, program and device for controlling a resistance welder, and a method, program and device for evaluating resistance welding.

BACKGROUND ART

A lot of components are often produced by joining a plurality of workpieces, and welding is used for joints requiring high strength. Particularly spot welding, one form of resistance welding, is used to efficiently weld overlapping steel sheets such as body parts of automobiles and other vehicles (a plurality of workpieces to be joined) at a plurality of points (spots). This spot welding is generally carried out by applying a high current for a short time to workpieces to be joined through electrodes which clamp each outer side of the workpieces and thereby melting and solidifying a joint portion (a welding portion) inside the overlapped workpieces.

By the way, unlike arc welding, spot welding forms a weld internally with respect workpieces to be joined and therefore, it is difficult to directly observe the weld. Besides, in mass production processes, it is not realistic for a worker to inspect weld states of spot welding one by one due to presence of jigs, tools and so on.

Therefore, a method for non-destructively evaluating whether spot welding is good or not with high efficiency and accuracy has been looked for. Proposals for such a method are disclosed, for example, in the following Patent Documents 1 to 5. All of these documents relate to methods for evaluating spot welding based on electric resistance of a nugget portion of its vicinity of workpieces to be joined.

CITATION LIST

Patent Literature

PTL 1: Japanese Unexamined Patent Publication No. S51-66,885
PTL 2: Japanese Unexamined Patent Publication No. H02-217,179
PTL 3: Japanese Unexamined Patent Publication No. H08-318,377
PTL 4: Japanese Unexamined Patent Publication No. H07-130,293
PTL 5: Japanese Unexamined Patent Publication No. 2008-254,005

SUMMARY OF INVENTION

Technical Problem (1) Patent Document 1 relates to a method for welding a tension band for a cathode ray tube and proposes to determine whether spot welding is good or not based on an electric resistance difference of a nugget between an initial part and a last part of current flow time (weld time). Patent Document 2 proposes to weld efficiently by optimizing an electric current value and current flow time to be supplied to workpieces to be joined based on the electric resistance difference.

Both these methods pay attention simply to the electric resistance difference, but does not have a sufficient physical basis and cannot be regarded as reliable evaluation methods. This is because an electric resistance value is determined by (volume) specific resistance, temperature and shape (length and cross sectional area) of an object to be measured. Generally speaking, temperature of workpieces to be joined as objects to be measured increases with lapse of weld time and shape of the workpieces varies due to softening. Therefore, even if a difference in electric resistance value is obtained, it is very unclear which of these factors is a major cause of this difference. Therefore, it cannot be said that such a clear relationship as indicated by the above patent documents is always seen between the electric resistance value difference and nugget shape, and these methods cannot be regarded as reliable evaluation methods.

Besides, when spot welding is carried out in production lines of automobiles or the likes, there is a lot of disturbance (a gap between workpieces to be joined, wear of electrodes, etc.) and the magnitude of electric resistance value ($R_0$) at the initial part of weld time is easily influenced by this disturbance. Therefore, it is not preferable to use $R_0$ as it is as an evaluation factor of a nugget. Furthermore, Patent Document 3 proposes a resistance spot welding method which determines whether expulsion occurs or not based on an output value of a certain learning type correlation formula upon an input of a value obtained based on a difference between resistance values during weld time and at an end of weld time. Because of use of the resistance value difference, this method also has the same problem as above.

(2) Patent Document 4 proposes to determine whether spot welding is good or not based on a resistance value measured by using the constant-current four-terminal method. Patent Document 5 proposes to measure electric resistance values of a weld area and a non-weld area after spot welding by using the constant-current four-terminal method and determine whether the spot welding is good or not based on ratio of these electric resistance values. However, these methods measure electric resistance values after welding and it is difficult to feed back measurement results to production lines on a timely basis.

Moreover, Patent Document 5 evaluates a nugget diameter by a resistance ratio obtained from the electric resistance values measured at different points. Such a method includes a lot of uncertain elements and does not have a sufficient physical basis, so it cannot be regarded as highly reliable evaluation methods just like the method of Patent Document 1 or 2. The conventionally proposed methods as mentioned above cannot always evaluate whether spot welding is good or not with high precision.

(3) The present invention has been made in view of these circumstances. It is an object of the present invention to provide a resistance welding method capable of enhancing reliability of a resistance welding evaluation method and stabilizing resistance welding, and a resistance welded member obtained by this resistance welding method. It is another object of the present invention to provide a resistance welder which is suitable for carrying out this resistance welding method, and a method, device and program for controlling the resistance welder. It is still another object of the present invention to provide a method, device and program for evaluating resistance welding in itself.

Solution to Problem

The present inventors have earnestly studied to solve these problems and, after much trial and error, have found that ratio of an electric resistance value of workpieces to be joined immediately before Joule heating stops to an electric resistance value of the workpieces in residual heat immediately after the Joule heating stops or vice versa correlates with size (diameter) of a nugget, which is formed by melting and solidifying of at least part of a welding portion of the workpieces. The present inventors have extended this finding and completed the following present invention about resistance welding.

<<Resistance Welding Method 1>>

(1) A resistance welding method according to the present invention comprises: a heating step of Joule heating a welding portion of workpieces to be joined by supplying heating current to electrodes (an electrode) in outer contact with the workpieces; a first resistance measuring step of measuring a first electric resistance value (R1) of the workpieces in a heating state before the heating step ends; a rest step of stopping the supply of the heating current for a predetermined time after the heating step ends; a second resistance measuring step of measuring a second electric resistance value (R2) of the workpieces in residual heat after the rest step; a calculating step of calculating ratio of the second electric resistance value to the first electric resistance value or vice versa (R2/R1 or R1/R2); a determining step of determining whether the calculated resistance ratio or an index value obtained from the resistance ratio and indicating a weld state of the welding portion falls in a predetermined range or not; and a reheating step of carrying out the Joule heating again when the resistance ratio or the index value falls in the predetermined range; thereby at least part of the welding portion being melted and solidified to form a nugget.

(2) According to the present invention, a weld state of resistance welding is accurately indicated by the abovementioned resistance ratio obtained from electric resistance values before and after joule heating of workpieces to be joined stops. Therefore, quality of resistance welding can be stabilized by heating again, if necessary, based on the resistance ratio or an index value derived from the resistance ratio.

By the way, the reason why a weld state of a welding portion can be accurately grasped based on the resistance ratio according to the present invention is assumed as follows: First, an electric resistance value (R) is determined by specific resistance (p), length (L), and cross-sectional area (S) of a material to be measured and expressed by R=p (L/S). Herein, since (L/S) is a form factor (K=L/S), which depends on the form of the material to be measured, the electric resistance value can be expressed by R=pK. It should be noted that when workpieces to be joined by resistance welding are materials to be measured, the abovementioned length is approximately expressed as thickness of the workpieces and the abovementioned cross-sectional area is approximately expressed as contact area of electrodes.

R1 and R2 according to the present invention are electric resistance values of workpieces to be joined before and after Joule heating stops and a time interval between R1 and R2 measurements is very short. In this very short time, the shape of the workpieces hardly changes. Therefore, the abovementioned form factor K hardly changes in this short time. As a result, the resistance ratio (R2/R1 or R1/R2) can be approximately equal to specific resistance ratio (p2/p1 or p1/p2). Herein, specific resistance depends on temperature. When the same material is used, the specific resistance ratio is also eventually determined by a first temperature (T1) of the workpieces at a time point when R1 is measured and a second temperature (T2) of the workpieces at a time point when R2 is measured. As a result, as a temperature difference (dT) between the first temperature and the second temperature is smaller, the resistance ratio is closer to 1 and as the temperature difference (dT) is greater, the resistance ratio is farther away from 1.

When resistance welding is good, at least part of workpieces to be joined is temporarily melted by Joule heating. At the time of solidification, the melted portion releases a large amount of latent heat of solidification. Accordingly, in a short time after the Joule heating stops, temperature of the workpieces does not change rapidly due to the released latent heat. Of course this tendency is more remarkable as the amount melted at the welding portion is greater. Since a weld nugget is formed by solidification of the melted portion, eventually this means that as nugget size is greater, the resistance ratio is closer to 1. Conversely, when a nugget is small or insufficiently formed, even in a short time between before and after the Joule heating stops, temperature of the workpieces sharply decreases and the abovementioned temperature difference (dT) becomes greater, so the resistance ratio is farther away from 1. Owing to this mechanism, the resistance ratio is believed to serve as an accurate index of a weld state of a welding portion upon appropriately setting a time interval between R1 and R2 measurements (rest time) in accordance with the material of the workpieces and desired nugget size. It should be noted that "rest" or a "rest step" mentioned in this specification only needs to make an appropriate time difference between R1 and R2 measurements. Therefore, for example, if heating current is supplied intermittently and its current application cycle is suitable for a time interval between R1 and R2 measurements, there is no need to take the trouble to provide a rest step. Of course, such a case is included in the concept of the present invention. Moreover, "resistance ratio" mentioned in the present invention is not limited in its calculation method and can be calculated either directly or indirectly. For example, even if resistance values (R1 and R2) in themselves are not obtained directly, the "resistance ratio" can be obtained indirectly from measurement values of electric current or voltage by using Ohm's law. Moreover, in the present invention, concrete values of the "resistance ratio" are not important in themselves. Therefore, of course the "resistance ratio" includes electric current ratio, voltage ratio or the like as long as it substantially falls under the above-mentioned description about the resistance ratio and is effective in accurately determining a weld state.

<<Resistance Welding Method 2>>

Moreover, the present invention is not limited to the abovementioned method including reheating workpieces to be joined and can be grasped as a resistance welding method which modifies a heating condition of the first heating step in accordance with the resistance ratio or the index value and improves weld quality of at least next welding spot or next workpieces to be joined.

That is to say, the present invention can be a resistance welding method comprising the abovementioned heating step, the first resistance measuring step, the rest step, the second resistance measuring step, and the calculating step, and further comprising a resetting step of changing a heating condition of the heating step in accordance with change in the calculated resistance ratio or an index value obtained from the resistance ratio and indicating a weld state of the welding portion.

It should be noted that this resetting step can be carried out in place of the above-mentioned reheating step or in combination with the reheating step. It is possible to make reheating unnecessary by optimizing heating conditions of the heating step in accordance with change in resistance ratio before causing defective welding. Besides, if the reheating step and the resetting step are carried out in combination, a good nugget can be formed at every welding spot regardless of the amount of change in resistance ratio.

<<Resistance Welded Member>>

If the abovementioned resistance welding method is employed, not only defective resistance welding can be prevented but also a product having nuggets of uniform size can be obtained. Therefore, the present invention can be grasped not only as the resistance welding method but also a resistance welded member in which respective nugget shapes are more stable than conventional ones.

<<Resistance Welder>>

The present invention can also be grasped as a device for realizing the above-mentioned resistance welding method. That is to say, the present invention can be a resistance welder comprising electrodes (an electrode) in outer contact with workpieces to be joined; a power supply unit for supplying heating current to the electrodes for Joule heating a welding portion of the workpieces; and a control device including a calculating unit for calculating resistance ratio (R2/R1 or R1/R2) which is ratio of a second electric resistance value (R2) of the workpieces in residual heat after supply of the heating current stops to a first electric resistance value (R1) of the workpieces in a heating state before the supply of the heating current stops or vice versa; a determining unit for determining whether the calculated resistance ratio or an index value obtained from the resistance ratio and indicating a weld state of the welding portion falls in a predetermined range or not; and a reheating unit for resupplying the heating current to the electrodes when the resistance ratio or the index value falls in the predetermined range.

<<Device, Method and Program for Controlling the Resistance Welder>>

Furthermore, the present invention can also be grasped as a device, method and program for controlling the abovementioned resistance welder.

(1) That is to say, the present invention can also be a device for controlling a resistance welder, comprising electrodes (an electrode) in outer contact with workpieces to be joined; and a power supply unit for supplying heating current to the electrodes for Joule heating a welding portion of the workpieces; the control device including a calculating unit for calculating resistance ratio (R2/R1 or R1/R2) which is ratio of a second electric resistance value (R2) of the workpieces in residual heat after supply of the heating current stops to a first electric resistance value (R1) of the workpieces in a heating state before the supply of the heating current stops or vice versa; a determining unit for determining whether the calculated resistance ratio or an index value obtained from the resistance ratio and indicating a weld state of the welding portion falls in a predetermined range or not; and a reheating unit for resupplying the heating current to the electrodes when the resistance ratio or the index value falls in the predetermined range.

(2) The present invention can also be a method for controlling a resistance welder having electrodes (an electrode) in outer contact with workpieces to be joined and a power supply unit for supplying heating current to the electrodes for Joule heating a welding portion of the workpieces, the control method comprising a heating step of Joule heating a welding portion of the workpieces by supplying the heating current to the electrodes; a first resistance measuring step of measuring a first electric resistance value (R1) of the workpieces in a heating state before the heating step ends; a rest step of stopping the supply of the heating current for a predetermined time after the heating step ends; a second resistance measuring step of measuring a second electric resistance value (R2) of the workpieces in residual heat after the rest step; a calculating step of calculating ratio of the second electric resistance value to the first electric resistance value or vice versa (R2/R1 or R1/R2); a determining step of determining whether the calculated resistance ratio or an index value obtained from the resistance ratio and indicating a weld state of the welding portion falls in a predetermined range or not; and a reheating step of carrying out the Joule heating again when the resistance ratio or the index value falls in the predetermined range.

(3) The present invention can also be a program for controlling a resistance welder, comprising instructions for a computer to execute the abovementioned method for controlling a resistance welder.

(4) The device, method or program for controlling a resistance welder according to the present invention can also comprise a constitutional feature in which the resetting step described in the resistance welding method is expressed as a "resetting step" or a "resetting unit", in place of or in combination with the abovementioned reheating unit or the reheating step.

(5) Moreover, the device, method or program for controlling a resistance welder according to the present invention may comprise not only the abovementioned heating unit (step), the first resistance measuring unit (step), the rest unit (step), the second resistance measuring unit (step), and the calculating unit (step) but also at least one of the following constitutional features to be carried out in accordance with the calculated resistance ratio or the index value obtained from the resistance ratio and indicating a weld state of the welding portion. Examples include a notifying unit (step) for giving a prior notice or warning of defective welding or electrode wear, a stop unit (step) for stopping resistance welding when it is determined that there is defective welding or electrode wear, and an electrode normalizing unit (step) for replacing or cleaning (including dressing up) electrodes when it is determined that there is defective welding or electrode wear.

It should be noted that these constitutional features can be carried out in place of the abovementioned reheating unit (step) or the resetting unit (step) or in combination with at least one of the reheating unit (step) and the resetting unit (step). In any case, like the resistance welding method, this device, method or program for controlling a resistance welder is effective in forming a good nugget or improving quality of a welded member.

<<Method, Program and Device for Evaluating Resistance Welding>>

In addition, the present invention can also be grasped as a method, program or device for evaluating resistance welding.

(1) That is to say, the present invention can also be a method for evaluating resistance welding, comprising a first resistance measuring step of supplying heating current to electrodes (an electrode) in contact with workpieces to be joined for Joule heating a welding portion of the workpieces, and measuring a first electric resistance value (R1) of the workpieces in a heating state before the supply of the heating current stops; a second resistance measuring step of measuring a second electric resistance value (R2) of the workpieces in residual heat after the supply of the heating current stops; a calculating step of calculating resistance ratio (R2/R1 or R1/R2) which is ratio of the second electric resistance value (R2) to the first electric resistance value (R1) or vice versa; and an estimating step of estimating a weld state of the welding portion of the workpieces based on the calculated resistance ratio.

(2) The present invention can also be a program for evaluating resistance welding, comprising instructions for a computer to execute the method for evaluating resistance welding.

(3) The present invention can also be a device for evaluating resistance welding, comprising a first resistance measuring unit for supplying heating current to electrodes in contact with workpieces to be joined for Joule heating a welding portion of the workpieces, and measuring a first electric resistance value (R1) of the workpieces in a heating state before the supply of the heating current stops; a second resistance measuring unit for measuring a second electric resistance value (R2) of the workpieces in residual heat after the supply of the heating current stops; a calculating unit for calculating resistance ratio (R2/R1 or R1/R2), which is ratio of the second electric resistance value (R2) to the first electric resistance value (R1) or vice versa; and an estimating unit for estimating a weld state of the welding portion of the workpieces based on the calculated resistance ratio.

(4) Moreover, the abovementioned estimating step (unit) can be an evaluating step (unit) of evaluating whether the a weld state of the welding portion is good or not by determining whether the calculated resistance ratio or an index value obtained from the calculated resistance ratio and indicating the weld state of the welding portion falls in a predetermined range or not. Besides, the abovementioned estimating step (unit) can be a nugget size estimating step (unit) for estimating size of a nugget formed by melting and solidifying of the welding portion from the resistance ratio based on previously prepared correlation between nugget size and the resistance ratio.

REFERENCE SINGS LIST

Figure 1:
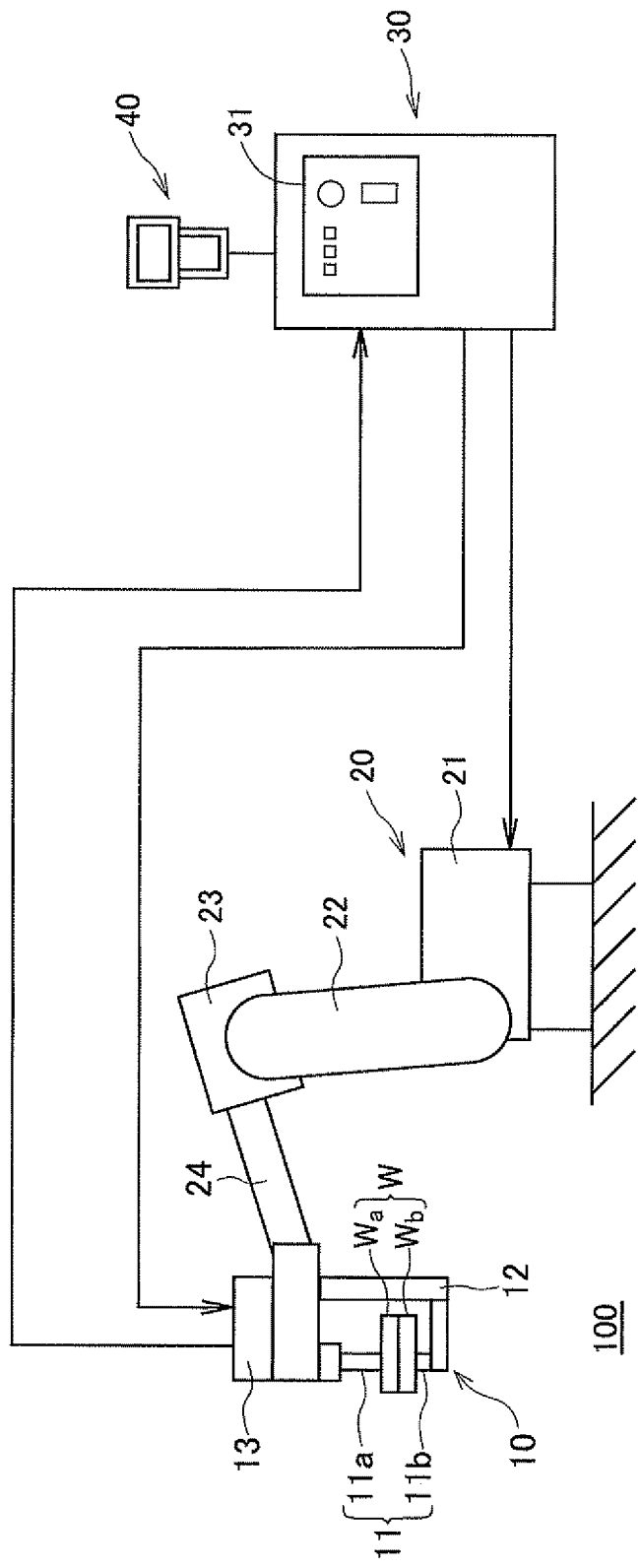
FIG. 1 is a schematic view of a spot welder.

11 Electrodes
20 A welding robot
30 A control device
40 A power supply unit
100 A spot welder
W Workpieces to be joined
R1 A first electric resistance value
R2 A second electric resistance value
X Resistance ratio

DESCRIPTION OF EMBODIMENTS

The present invention will be described in more detail by way of preferred embodiments of the present invention. Hereinafter, discussion will be made mainly about a resistance welding method according to the present invention. However, the discussion will also be appropriately applied not only to the resistance welding method but also any of a resistance welded member, a resistance welder, a device, method and program for controlling a resistance welder, and a method, program and device for evaluating resistance welding. The present invention can be constituted by adding one or more selected arbitrarily from the following constituent features to the above-mentioned construction. The constitutional feature to be added can be selected multiply or arbitrarily beyond categories. It should be noted that which embodiment is best depends on application targets, required performance and so on.

<<Electric Resistance Value>>

(1) A first electric resistance value (R1) or a second electric resistance value (R2) (hereinafter simply referred to as "electric resistance values") can be measured by a measuring device provided separately from devices essential for resistance welding. However, if the electric resistance values are measured by way of electrodes, electric resistance values at the time of resistance welding can be measured stably. In addition, if the first electric resistance value (R1) is calculated based on an electric current value of heating current, it is efficient. If the second electric resistance value (R2) is calculated based on an electric current value of measuring current supplied through electrodes, it is similarly efficient. It should be noted that when the abovementioned power supply unit is an AC power supply, electric resistance values can be measured or calculated based on effective current values, effective voltage values, peak current values or peak voltage values.

(2) When a welding portion of workpieces to be joined is heated by application of heating current, temperature distribution is produced there. In accordance with this temperature distribution, specific resistance distribution is produced at the welding portion. Therefore, electric resistance values to be measured are distribution average values in a range from an inner portion to an outer portion of the workpieces. However, the inner portion has a higher temperature and a far larger specific resistance than the outer portion, which is easily cooled because of contact with electrodes. When the inner portion having a high temperature has a considerable size, eventually electric resistance values of the inner portion dominate those of the entire portion. Given this perspective, as a matter of practice, measured electric resistance values R1, R2 can fairly accurately indicate inner temperature of a welding portion of the workpieces. As a result, it is believed that a weld state of the workpieces is accurately grasped by the resistance ratio of the present invention.

(3) As the timing of R1 measurement is closer to the time when supply of the heating current stops as long as it is before the supply of the heating current stops, a weld state (nugget diameter) can be more accurately grasped. Although depending on desired nugget size, generally the timing of R1 measurement can be 1 to 40 msec before the heating current stops. The timing of R2 measurement is when a predetermined time (rest time) has passed since the supply of the heating current stops. Preferable rest time differs depending on desired nugget size or the amount of heat extracted from electrodes, but it is preferable to determine the timing of R2 measurement in consideration of cooling delay time of workpieces to be joined due to solidification latent heat in forming a nugget. Generally, the rest time is 10 to 100 msec. This range is preferable because the workpieces are in residual heat in a relatively high temperature range. When the temperature of the workpieces in residual heat is excessively low, the resistance ratio is farther away from 1, and the range of measurement gets smaller, and accurate evaluation of a weld state becomes difficult.

<<Resistance Ratio or Index Value>>

(1) By considering the resistance ratio of R1 and R2, the shape factor of workpieces to be joined at the time of resistance welding is almost cancelled. As a result, the resistance ratio is reduced to specific resistance ratio which depends almost only on temperature. From this viewpoint, the resistance ratio of the present invention is not limited to R2/R1 and can be R1/R2. This resistance ratio satisfies $0<(R2/R1)<1$ or $1<(R1/R2)$, and in either case, a weld state can be judged from how far away the resistance ratio is from 1.

(2) A weld state of resistance welding can be grasped by directly using the resistance ratio, but can also be grasped by using an index value obtained from the resistance ratio and indicating a weld state of the welding portion. A typical index value is nugget size (nugget diameter). Since there is a correlation between the resistance ratio and nugget diameter, it is possible in the present invention to estimate or evaluate a weld state of resistance welding by using either one of the two.

<<Workpieces>>

(1) The shape, material or the like of workpieces to be joined is not limited. Typical workpieces are overlapped steel sheets. For example, mild steel sheets having a thickness of about 0.5 to 3 mm and containing 0.05 to 0.2 mass % carbon are used for resistance welding. In addition to the above, raw materials such as stainless steel, aluminum (Al), an Al alloy, copper (Cu), a Cu alloy, nickel (Ni), and an Ni alloy can be used as workpieces to be joined. Moreover, workpieces to be joined can be a combination of different materials.

(2) Specific resistance of a material changes depending on temperature, but in some materials the rate of change differs depending on temperature range. For example, specific resistance of mild steel sheets has a slow rate of change with temperature in a high temperature range (for example, 800 deg. C or more) and a rapid rate of change with temperature in a low temperature range. In other words, specific resistance ratio of mild steel sheets is close to 1 in a high temperature range and far away from 1 in a low temperature range. Since the resistance ratio (R2/R1 or R1/R2) according to the present invention comes to be approximately equal to specific resistance ratio (p2/p1 or p1/p2) as described before herein, mild steel sheets eventually have a tendency that the resistance ratio is close to 1 in a high temperature range and far away from 1 in a low temperature range.

Besides, if resistance welding is good, the first electric resistance value R1 and the second electric resistance value R2 of the present invention are measured in neighboring high temperature ranges due to release of solidification latent heat. Accordingly, when workpieces to be joined are mild steel sheets, the fact that measurement temperatures of R1 and R2 are close to each other and the fact that the rate of change in specific resistance is slow in a high temperature range function synergistically, so the resistance ratio of the workpieces shows a tendency to be closer to in the double meaning. In this case, the resistance ratio of the workpieces indicates a weld state of resistance welding with higher accuracy.

Conversely, when resistance welding is poor, the fact that measurement temperatures of R1 and R2 are far away from each other and the fact that rate of change in specific resistance is rapid in a low temperature range function synergistically, so the resistance ratio of the workpieces shows a tendency to be farther away from 1 in the double meaning. In this case, too, the resistance ratio of the workpieces indicates a weld state of resistance welding with higher accuracy. From these reasons, it is preferable that workpieces to be joined are formed of a material having specific resistance whose rate of change with temperature is slow in a high temperature range and rapid in a low temperature range. Examples of such a material include an iron alloy (carbon steel) including the aforementioned mild steel, Al and an Al alloy.

<<Electrodes>>

The shape, material, or the like of electrodes is not limited. Generally, electrodes are formed of copper in a solid or hollow cylindrical shape. In a case of hollow cylindrical electrodes, it is preferable that coolant water is supplied to the inside of the cylindrical electrodes so as to forcibly cool the electrodes, because electrode wear can be suppressed.

End portions of the electrodes in outer contact with workpieces to be joined often have a circular or slight conical shape (a dome shape). When resistance welding is good, shape of a nugget formed at a welding portion conforms to shape of electrode end portions, so it is often roughly circular. In such a case, nugget size is represented by its diameter (nugget diameter). Hereinafter, nugget size will be appropriately referred to as nugget diameter for the purpose of convenience.

<<Power Supply Unit>>

A power supply unit can be either a DC or AC power supply unit. Examples of an AC power supply unit include a single-phase power supply unit and a three-phase powder supply unit. The power supply unit can be a constant current power supply unit or a constant voltage power supply unit. A constant current power supply unit is preferable, because the amount of Joule heat which is generated as temperature of workpieces to be joined rises upon heating increases and as a result a nugget is reliably formed by melting and solidifying of at least part of a welding portion of the workpieces. It should be noted that preferable electric current values supplied from electrodes to workpieces to be joined differ depending on the material of the workpieces, desired nugget diameter, weld time and so on.

EXAMPLES

The present invention will be described more concretely by way of an example.

<<Spot Welder>>

(1) A spot welder 100 according to an example of the spot welder of the present invention is shown in FIG. 1. The spot welder 100 is equipped with an articulated welding robot 20, a control device 30 for controlling the welding robot 20, and a power supply unit 40.

The welding robot 20 is a 6-axis vertical articulated robot and comprises a base 21 fixed on the floor in a manner to be rotatable around a vertical first axis, an upper arm 22 connected to the base 21, a forearm 23 connected to the upper arm 22, a wrist element 24 rotatably connected to a fore-end portion of the forearm 23, and a spot welding gun 10 attached to a fore-end portion of the wrist element 24. The upper arm 22 is connected to the base 21 in a manner to be rotatable around a horizontal second axis. The forearm 23 is connected to an upper end portion of the upper arm 22 in a manner to be rotatable around a horizontal third axis. The wrist element 24 is connected to the fore-end portion of the forearm 23 in a manner to be rotatable around a fourth axis which extends in parallel to an axis of the forearm 23. The spot welding gun 10 is attached to the fore-end portion of the wrist element 24, by way of another wrist element (not shown) rotatable around a fifth axis which is perpendicular to an axis of the forearm 23, in a manner to be rotatable around a sixth axis which is perpendicular to the fifth axis.

The spot welding gun 10 comprises a gun arm 12 in a shape of inverted "L" and a servo motor 13. The gun arm 12 is provided with a pair of electrodes 11 (a movable electrode 11*a* and an opposite electrode 11*b*).

The movable electrode 11*a* is driven by the servo motor 13 in a manner to be capable of getting in contact with or away from workpieces W to be joined, and clamps the workpieces W with a desired pressure in cooperation with the opposite electrode 11*b* which is placed coaxially in a sheet thickness direction of the workpieces W. The movable electrode 11*a* and the opposite electrode 11*b* are formed of a copper alloy in a shape of a hollow cylinder with a bottom, and their inner portions are forcibly cooled by circulating cooling water.

The control device 30 includes a robot-driving circuit (not shown) and controls driving of the welding robot 20 and the spot welding gun 10. The control device 30 also includes an electric power circuit (not shown) and controls electric powder (at least one of voltage and current) to be supplied to the workpieces W through the electrodes 11. These circuits control an electric current value to be supplied to the workpieces W, current flow time (weld time), current flow start and end timing (weld timing), clamping force (pressure) applied on the workpieces W by the electrodes 11 and so on. Necessary conditions for the control are input from a control panel 31.

The power supply unit 40 is a constant AC current regulator which can stably supply a high constant current by boosting voltage of a single-phase or three-phase power supply. The power supply unit 40 is controlled by the control device 30.

(2) This spot welder 100 is operated as follows. Workpieces W to be joined by spot welding are placed on a holder table (not shown). Then, welding spots of the workpieces W are input into the control device 30 of the spot welder 100. Welding conditions such as force of clamping the workpieces W by the electrodes 11, an electric current value to be supplied to the electrodes 11, and weld time (current flow time) are also input in order to obtain a desired nugget diameter.

When the spot welder 100 is then activated, the welding robot 20 controlled by the control device 30 moves the spot welding gun 10 sequentially to respective welding spots. The electrodes 11 provided at the spot welding gun 10 are driven by the servo motor 13 which is controlled by the control device 30 so as to clamp the workpieces W with a preset pressure. Under this state, predetermined constant current is supplied from the power supply unit 40 to the workpieces W for a predetermined time. Upon repeating this at a plurality of preset spots, formation of spot welded workpieces W (a welded member) is completed.

Figure 2:
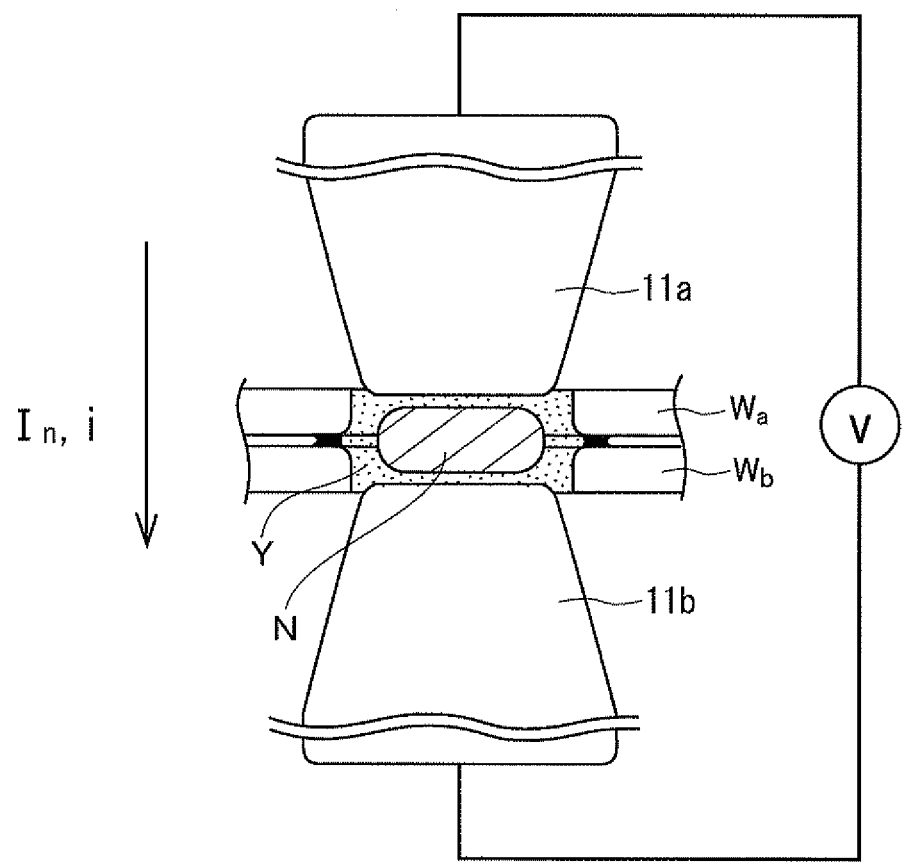
FIG. 2 is an explanatory view around a welding portion of workpieces to be joined.

(3) A schematic view around a welding spot is shown in FIG. 2. If spot welding is good, the workpieces W (a workpiece Wa and a workpiece Wb) formed of mild steel sheets and contacting each other are melted and solidified at an inner portion thereof to form a nugget N. It should be noted that a portion which is heated while pressed by the electrodes 11 is a welding portion Y and generally the nugget N is included by the welding portion Y.

<<Device and Method for Controlling a Spot Welder>>

(1) The control device 30 according to the example of the present invention further includes a compensation circuit (not shown) for monitoring a weld state of a welding spot. This compensation circuit comprises a calculating unit for calculating resistance ratio X (=R2/R1) which is ratio of a second electric resistance value R2 to a first electric resistance value R1 which are measured by way of the electrodes 11 after and before supply of electric current (heating current) to the workpieces W for spot welding stops, respectively, and a determining unit for determining whether the calculated resistance ratio X is equal to or greater than a predetermined threshold value Xn, and a reheating unit for giving an instruction for resupplying the heating current to the electrodes 11 when the resistance ratio X is smaller than the threshold value Xn.

Figure 3:
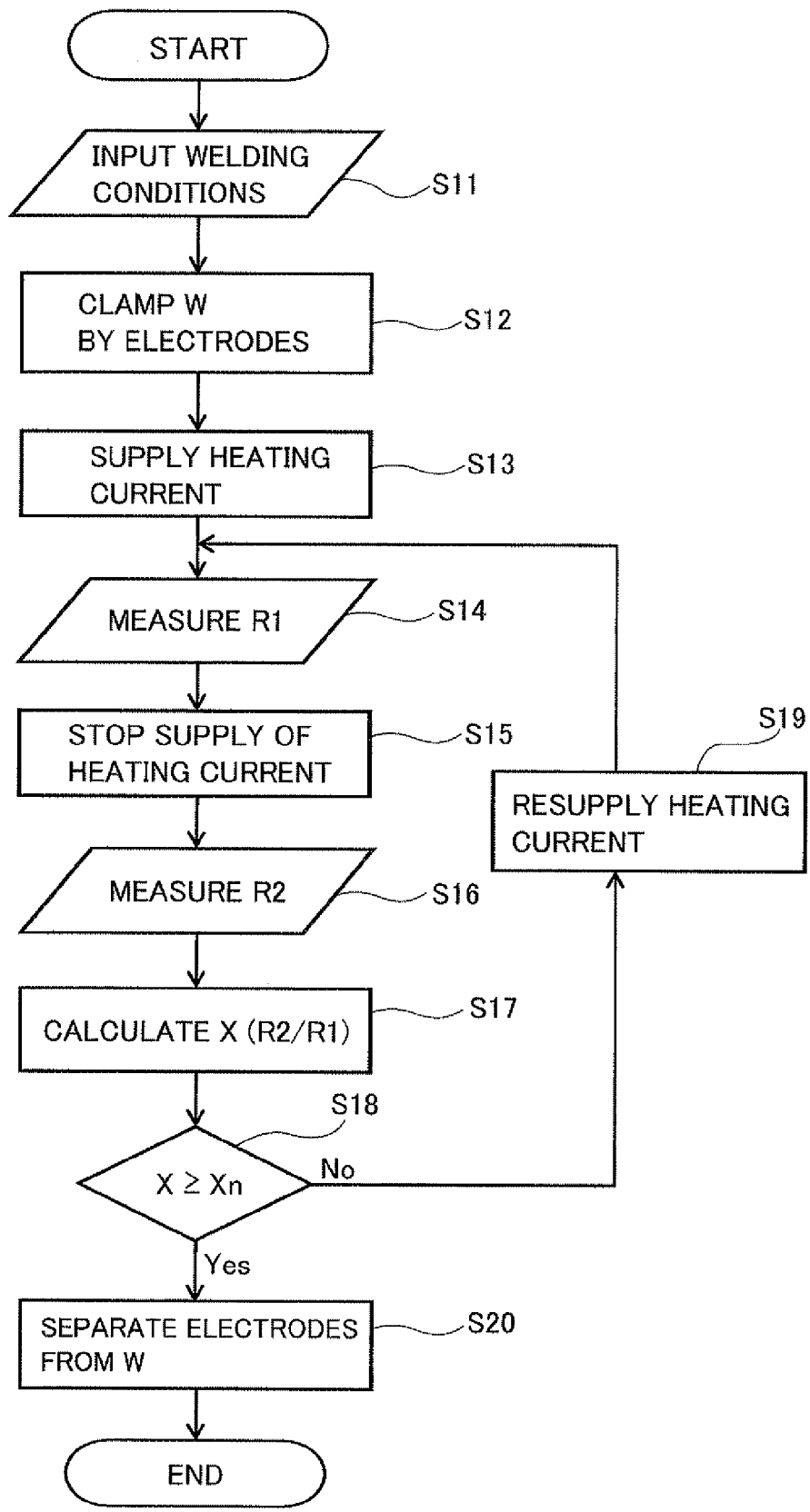
FIG. 3 is a flowchart of a spot welding method according to the example of the present invention.

(2) A method for controlling the spot welder 100 by the control device 30 is shown in a flowchart of FIG. 3. It should be noted that by carrying out the control method shown in FIG. 3, respective steps of the spot welding method of the present invention are realized and spot welded workpieces W (a welded member) are produced. First, in step S11, various welding conditions are input and set. Specifically, these are material and sheet thickness of the workpieces Wa, Wb, number and position of welding spots, chip shape of the electrodes 11a, 11b, pressure of the electrodes 11 on the workpieces W, an initial heating current value I1 for spot welding, current flow time (weld time) t1 of the heating current value I1, a measuring current value i for R2 measurement, current flow time tm of the measuring current value i, time (rest time) tr from stop of the supply of the heating current value I1 to start of supply of the measuring current value i, a threshold value Xn for resistance ratio X associated with a desired nugget diameter, a reheating current value I2 (In in the case of repeating n times) which is supplied in the case of reheating, current flow time (weld time) t2 (tn in the case of repeating n times or more) of the reheating current value I2 and so on.

In step S12, the welding robot 20 and the spot welding gun 10 are actuated to make end surface portions of the electrodes 11a, 11b (electrode tips) in contact (outer contact) with both outer sides of the workpieces W. At this time, the electrodes 11 apply pressure on the workpieces W based on the set value of step S11. In step S13, initial supply of heating current is carried out for spot welding. That is to say, the heating current value I1 is supplied to the electrodes 11 for current flow time t1 (heating step).

In step S14, a first electric resistance value R1 of the workpieces W is measured (a first electric resistance measuring step). This R1 is calculated based on a heating current value I1 (In) just before the supply of the heating current of Step S13 stops and a heating voltage value V1 (Vn). Specifically, when the heating current is an AC, the R1 is calculated based on an effective current value supplied through the electrodes 11 and its effective voltage value in the last cycle time (Ct) of the supply of the heating current. It should be noted that 1 Ct is one cycle of alternating current and for example, in the case of AC at 60 cycles per second, 1 Ct=1/60 sec.

In step S15, the supply of the heating current value I1 (In) stops. After that, no electric current is supplied for the rest time tr set in step S11 (rest step). This tr is set to time during which, if spot welding is good, the workpieces W heated by the heating current value I1 (In) maintain high temperature residual heat, although cooled by the electrodes 11. In terms of the abovementioned Ct, this tr is a very short time of about 1 to 5 Ct, although depending on current flow time tn of the heating current value In.

In step S16, a second electric resistance value R2 of the workpieces W in residual heat after the supply of heating current stops is measured (a second resistance measuring step). This R2 is calculated based on a measuring current value i supplied separately through the electrodes 11. Specifically, when the measuring current value i is AC like the heating current value I1, the R2 is calculated from an effective current value and an effective voltage value. Current flow time of this measuring current value i can be about 1 Ct as in R1 measurement. In step S17, resistance ratio X (R2/R1) is calculated based on R1 and R2 measured respectively in step S14 and step S16 (calculating step).

In step S18, which is greater of the resistance ratio X and the threshold value Xn set in step S11 is determined (determining step). When X is smaller than Xn, it is determined that a desired nugget is not formed at a welding portion and it goes to step S19, where the heating current is resupplied (reheating step). A heating current value I2 (In) resupplied to the electrodes 11 and heating current flow time t2 (tn) can be the same as I1 and t1, but because spot welding is insufficient, I2 (In) and t2 (tn) can be greater than I1 and t1, respectively. Conversely, because the workpieces have been heated at least once and are in residual heat, in some cases I2 (In) and t2 (tn) can be smaller than I1 and t1, respectively. Moreover, In and tn can vary in accordance with reheating times.

However, if reheating is repeated for several times, there is a possibility that the electrodes 11, especially tips at end surface portions are worn or degraded. In such a case, the heating current can be resupplied after replacing the electrodes 11 or dressing the end surface portions of the electrodes 11 so that electric conduction between the workpieces W and the electrodes 11 is returned to normal.

In some cases, when reheating is necessary at one spot, an initial heating current value In (the amount of heating current power) to be supplied at the next spot can be increased. From the viewpoint of production efficiency, an increase in the heating current value I1 is preferred to an increase in the heating current flow time t1.

Next, when X is equal to or greater than Xn, it is determined that a desired nugget is formed at the welding portion and it goes to step S20, where the electrodes 11 are separated from the workpieces W and welding at the spot ends.

<<Device and Method for Evaluating Spot Welding>>

A weld state of spot welding can be evaluated by carrying out the steps S14 to S18 shown in FIG. 3. Here, the measurements of the first electric resistance value R1 and the second electric resistance value R2 can be conducted not only by way of the electrodes 11 but also by using a separately provided measuring probe. Evaluating whether the weld state is good or not alone can be carried out by determining which is greater of the resistance ratio X and the threshold value Xn as in step S18 (estimating step, evaluating step). The step S18 can be replaced with a step of estimating a nugget diameter D of the welding portion from the resistance ratio X based on a previously prepared data base of correlation between the resistance ratio X and nugget diameter D (nugget estimating step).

<<Correlation Between Resistance Ratio X and Nugget Diameter D>>

The correlation between the resistance ratio X and nugget diameter D was obtained by practically carrying out spot welding as follows:

(1) Spot welding was carried out by placing electrodes in outer contact with both outer sides of workpieces comprising two overlapped cold-rolled mild steel sheets (JIS SPC270) each having a thickness of 2 mm. Each of the electrodes had a circular end portion (6 mm in diameter) and its end surface had a curvature radius of 40 mm. These electrodes were pressed against the workpieces with a pressure of 3430 N and heating current having an effective current value 11 kA was supplied to the electrodes for t1=20 Ct (20/60 sec). A power supply employed was a single-phase AC at 60 cycles per second. In the last Ct of supply of the heating current, a first electric resistance value R1 was measured by the abovementioned method.

Figure 4:
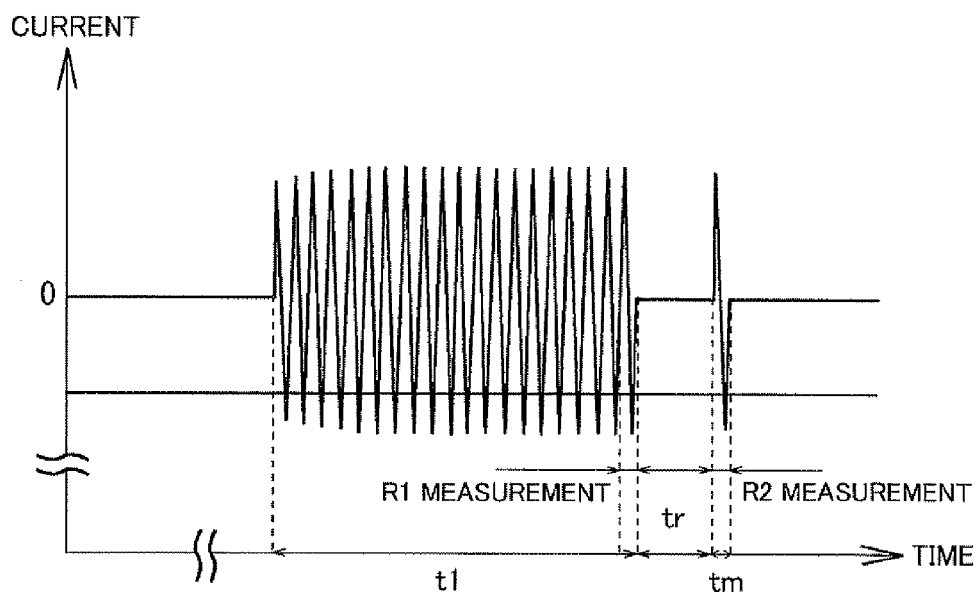
FIG. 4 is a time chart of electric current supplied in the spot welding method of FIG. 3.

After a predetermined time (here tr=1 Ct, 2 Ct, or 4 Ct) passed since the supply of the heating current stopped, measuring current which did not contribute to heating of the welding portion and had an effective current value of 5 kA was supplied for t2=1 Ct (1/60 sec). Thus a second electric resistance value R2 was measured by the above-mentioned method. A time chart of electric current supplied to the workpieces through the electrodes in measuring each resistance value is schematically shown in FIG. 4.

(2) Plural kinds of spot welding were carried out by variously changing heating time and rest time. Workpieces after the plural kinds of spot welding were cut at each welding portion and a nugget diameter D of each welding spot was measured. Correlation between the resistance ratio X of each welding spot and the nugget diameter D is summarized in FIG. 5.

Figure 5:
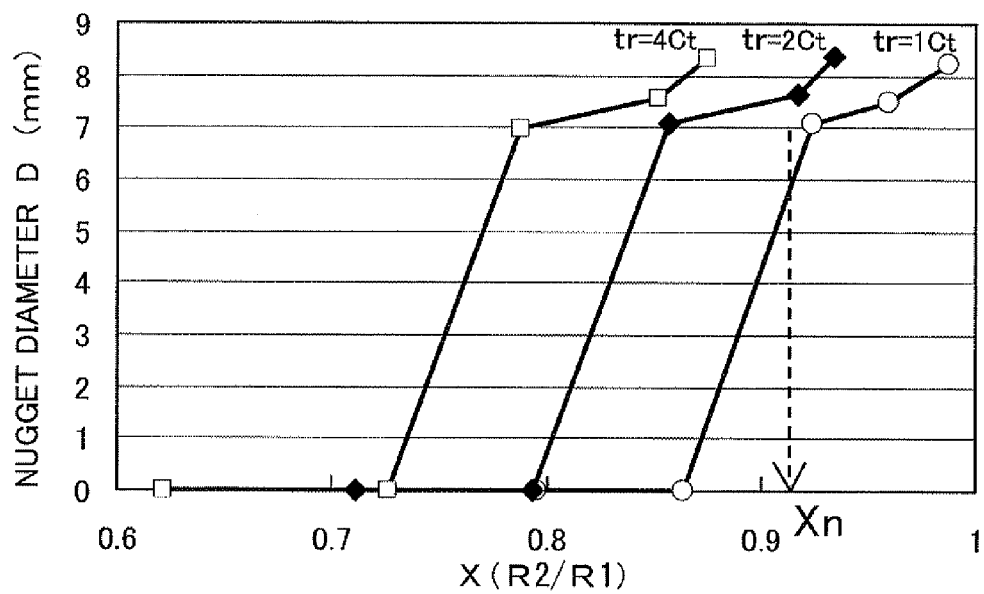
FIG. 5 is a correlation diagram between resistance ratio X (R2/R1) and nugget diameter D according to the example of the present invention.

(3) As apparent from FIG. 5, it was confirmed that in a range where D>0, a one to one correspondence is established between the resistance ratio X and the nugget diameter D. As the rest time tr was longer, the X-D correlation line shifts to a smaller resistance ratio X. However, it was confirmed that even if the rest time tr as a parameter changes, correlation between the resistance ratio X and the nugget diameter D does not change much and shows a very similar tendency.

It was also confirmed that, in a region where the nugget diameter D is large (a region where a weld state of spot welding is good), the rate of change in the nugget diameter D to change in the resistance ratio X is slow. On the other hand, it was also confirmed that, in a region where the nugget diameter D is small (a region where spot welding is insufficient), the rate of change in the nugget diameter D to change in the resistance ratio X is rapid. It has also become apparent that especially when the resistance ratio X is not more than a certain value, the nugget diameter D substantially converges on 0 and the workpieces were not melted or solidified.

(4) The results shown in FIG. 5 indicate that upon setting an appropriate threshold value Xn in accordance with rest time tr and employing the abovementioned spot welding method, it is possible to conduct high quality spot welding which ensures a desired nugget diameter D of each welding spot.

Similarly, use of the results of FIG. 5 facilitates judging and evaluating a weld state of spot welding. For example, it is possible to obtain a corresponding nugget diameter D from a calculated resistance ratio X and intuitively evaluate a weld state of spot welding.

Obviously, many modifications and variations of the present invention are possible in the light of the above teachings. It is therefore to be understood that within the scope of the appended claims, the invention may be practiced otherwise than as specifically described.

The invention claimed is:

1. A resistance welding method comprising:
 a heating step of Joule heating a welding portion of workpieces to be joined by supplying heating current to electrodes in outer contact with the workpieces;
 a first resistance measuring step of measuring a first electric resistance value (R1) of the workpieces in a heating state before the heating step ends;
 a rest step of stopping the supply of the heating current for a predetermined time after the heating step ends;
 a second resistance measuring step of measuring a second electric resistance value (R2) of the workpieces in residual heat after the rest step;
 a calculating step of calculating ratio of the second electric resistance value to the first electric resistance value or vice versa (R2/R1 or R1/R2);
 a determining step of determining whether the calculated resistance ratio or an index value obtained from the resistance ratio and indicating a weld state of the welding portion falls in a predetermined range or not; and
 a reheating step of carrying out the Joule heating again when the resistance ratio or the index value falls in the predetermined range;
 thereby at least part of the welding portion being melted and solidified to form a nugget.

2. The resistance welding method according to claim 1, wherein the first resistance measuring step is a step of calculating the first electric resistance value based on an electric current value of the heating current.

3. The resistance welding method according to claim 1, wherein the second resistance measuring step is a step of calculating the second electric resistance value based on an electric current value of measuring current supplied through the electrodes.

4. The resistance welding method according to claim 1, wherein the index value is a value indicating size of the nugget.

5. The resistance welding method according to claim 1, wherein the workpieces comprise steel sheets.

6. The resistance welding method according to claim 1, wherein the electrodes are forcibly cooled from an inside thereof.

7. The resistance welding method according to claim 1, wherein end portions of the electrodes in outer contact with the workpieces have a circular or conical shape.

8. A resistance welding method comprising:
  a heating step of Joule heating a welding portion of workpieces to be joined by supplying heating current to electrodes in outer contact with the workpieces;
  a first resistance measuring step of measuring a first electric resistance value (R1) of the workpieces in a heating state before the heating step ends;
  a rest step of stopping the supply of the heating current for a predetermined time after the heating step ends;
  a second resistance measuring step of measuring a second electric resistance value (R2) of the workpieces in residual heat after the rest step;
  a calculating step of calculating ratio of the second electric resistance value to the first electric resistance value or vice versa (R2/R1 or R1/R2); and
  a resetting step of changing a heating condition of the heating step in accordance with change in the calculated resistance ratio or an index value obtained from the resistance ratio and indicating a weld state of the welding portion.

9. A resistance welder, comprising:
  electrodes in outer contact with workpieces to be joined;
  a power supply unit for supplying heating current to the electrodes for Joule heating a welding portion of the workpieces; and
  a control device including:
  a calculating unit for calculating a resistance ratio (R2/R1 or R1/R2) which is a ratio of a second electric resistance value (R2) of the workpieces in residual heat after supply of the heating current stops to a first electric resistance value (R1) of the workpieces in a heating state before the supply of the heating current stops or vice versa;
  a determining unit for determining whether the calculated resistance ratio or an index value obtained from the resistance ratio and indicating a weld state of the welding portion falls in a predetermined range or not; and
  a reheating unit for resupplying the heating current to the electrodes when the resistance ratio or the index value falls in the predetermined range.

10. A method for evaluating resistance welding, comprising:
  a first resistance measuring step of supplying heating current to electrodes in outer contact with workpieces to be joined for Joule heating a welding portion of the workpieces, and measuring a first electric resistance value (R1) of the workpieces in a heating state before the supply of the heating current stops;
  a second resistance measuring step of measuring a second electric resistance value (R2) of the workpieces in residual heat after the supply of the heating current stops;
  a calculating step of calculating resistance ratio (R2/R1 or R1/R2), which is ratio of the second electric resistance value (R2) to the first electric resistance value (R1) or vice versa; and
  an estimating step of estimating a weld state of the welding portion of the workpieces based on the calculated resistance ratio.

11. The method for evaluating resistance welding according to claim 10, wherein the estimating step is an evaluating step of evaluating the weld state of the welding portion by determining whether the calculated resistance ratio or an index value obtained from the resistance ratio and indicating the weld state of the welding portion falls in a predetermined range or not.

12. The method for evaluating resistance welding according to claim 10, wherein the estimating step is a nugget estimating step of estimating the size of a nugget formed by melting and solidifying of at least part of the welding portion from the resistance ratio based on previously prepared correlation between nugget size and predetermined resistance ratio.

13. A device for evaluating resistance welding, comprising:
  a first resistance measuring unit for supplying heating current to electrodes in outer contact with workpieces to be joined for Joule heating a welding portion of the workpieces, and measuring a first electric resistance value (R1) of the workpieces in a heating state before the supply of the heating current stops;
  a second resistance measuring unit for measuring a second electric resistance value (R2) of the workpieces in residual heat after the supply of the heating current stops;
  a calculating unit for calculating a resistance ratio (R2/R1 or R1/R2), which is a ratio of the second electric resistance value (R2) to the first electric resistance value (R1) or vice versa; and
  an estimating unit for estimating a weld state of the welding portion of the workpieces based on the calculated resistance ratio.

* * * * *